US009026516B1

(12) United States Patent
Chapin et al.

(10) Patent No.: US 9,026,516 B1
(45) Date of Patent: May 5, 2015

(54) INTEREST-BASED KEYWORDS FOR PROMINENT ENTITY AND BY LOCATION

(75) Inventors: Charles Chapin, San Jose, CA (US); Vibhor Nanavati, Sunnyvale, CA (US); Xuefu Wang, Los Altos, CA (US); Xinyu Tang, Cupertino, CA (US); Bhavesh R. Mehta, Cupertino, CA (US); Shalini Agarwal, San Francisco, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 13/206,017

(22) Filed: Aug. 9, 2011

(51) Int. Cl.
G06F 17/30 (2006.01)

(52) U.S. Cl.
CPC .................. G06F 17/3005 (2013.01)

(58) Field of Classification Search
CPC ................................................ G06F 17/30867
USPC ......... 707/706, 707, 721, 732, 748, 751, 768, 707/774, 723, 724, 725, 731, 737, 738
See application file for complete search history.

(56) References Cited

U.S. PATENT DOCUMENTS

| | | | |
|---|---|---|---|
| 8,326,826 B1 | 12/2012 | Upstill et al. | |
| 2005/0065916 A1* | 3/2005 | Ge et al. | 707/3 |
| 2009/0182725 A1* | 7/2009 | Govani et al. | 707/5 |
| 2009/0327286 A1* | 12/2009 | Ge et al. | 707/5 |
| 2010/0281011 A1* | 11/2010 | Santi et al. | 707/706 |
| 2011/0137881 A1* | 6/2011 | Cheng et al. | 707/706 |
| 2012/0036123 A1 | 2/2012 | Hasan et al. | |
| 2012/0143859 A1* | 6/2012 | Lymperopoulos et al. | 707/724 |
| 2012/0158705 A1* | 6/2012 | Konig et al. | 707/723 |
| 2012/0197732 A1 | 8/2012 | Shen et al. | |

OTHER PUBLICATIONS

Co-pending U.S. Appl. No. 13/205,964 entitled "Interest-Based Local Content Targeting" by Charles Chapin, filed Aug. 9, 2011.
Co-pending U.S. Appl. No. 13/205,993 entitled "Interest-Based Keyword Weighting by Location" by Charles Chapin, filed Aug. 9, 2011.
Google Search accessed at http://www.google.com/ on Apr. 30, 2013.

* cited by examiner

*Primary Examiner* — Etienne Leroux
*Assistant Examiner* — Cindy Nguyen
(74) *Attorney, Agent, or Firm* — Marshall, Gerstein & Borun LLP

(57) ABSTRACT

Methods, systems, and apparatus, including computer programs encoded on a computer-readable storage medium, and including a method for providing content. The method comprises receiving a request for content from a user, the request for content being associated with a location and including one or more keywords. The method further comprises determining a prominent entity in proximity to the location and one or more categories associated with the prominent entity. The method further comprises evaluating historical search queries received from the user to determine one or more interests of the user. The method further comprises determining one or more additional keywords based on the evaluating. The method further comprises determining one or more content items based at least in part on the one or more keywords, the categories and the one or more additional keywords. The method further comprises providing the one or more content items responsive to the request.

20 Claims, 7 Drawing Sheets

INTEREST-BASED KEYWORDS FOR PROMINENT ENTITY AND BY LOCATION

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include another method for providing content. The method comprises receiving a request for content from a user, the request for content being associated with a location and including one or more keywords. The method further comprises determining a prominent entity in proximity to the location and one or more categories associated with the prominent entity. The method further comprises evaluating historical search queries received from the user to determine one or more interests of the user. The method further comprises determining one or more additional keywords based on the evaluating. The method further comprises determining one or more content items based at least in part on the one or more keywords, the categories and the one or more additional keywords. The method further comprises providing the one or more content items responsive to the request.

These and other implementations can each optionally include one or more of the following features. Determining one or more content items can include ranking the one or more content items, where ranking includes ranking the one or more content items based at least in part on the user's interests. The location can be determined from latitude/longitude coordinates of a viewport in a map-related application. The location can be determined from GPS coordinates of a user device. The location can be determined from street addresses in a map-related application. Evaluating historical search queries can include evaluating search terms included in the one or more historical search queries to determine user interests. Evaluating historical search queries can include evaluating a content item that satisfies a historical search query to determine user interests.

In general, another innovative aspect of the subject matter described in this specification can be implemented in systems that include a content management system that provides content items responsive to received requests. The system comprises a query handler that receives queries and location information and stores the queries in association with the location information. The system further comprises a location engine that determines a location associated with a request for content. The system further comprises a prominent entity engine that determines a prominent entity for a location. The system further comprises a weighting engine that weights keywords based on user interests. The system further comprises a ranking engine that ranks content items that are responsive to received requests based at least in part on keywords and the stored queries.

In general, another innovative aspect of the subject matter described in this specification can be implemented in computer program products that include a computer program product tangibly embodied in a computer-readable storage device and comprising instructions that, when executed by a processor, perform another method for providing content. The method comprises receiving a request for content from a user, the request for content being associated with a location and including one or more keywords. The method further comprises determining a prominent entity in proximity to the location and one or more categories associated with the prominent entity. The method further comprises evaluating historical search queries received from the user to determine one or more interests of the user. The method further comprises determining one or more additional keywords based on the evaluating. The method further comprises determining one or more content items based at least in part on the one or more keywords, the categories and the one or more additional keywords. The method further comprises providing the one or more content items responsive to the request.

These and other implementations can each optionally include one or more of the following features. The location can be determined from latitude/longitude coordinates of a viewport in a map-related application. The location can be determined from GPS coordinates of a user device. The location can be determined from street addresses in a map-related application. Evaluating historical search queries can include evaluating search terms included in the one or more historical search queries to determine user interests. Evaluating historical search queries can include evaluating a content item that satisfies a historical search query to determine user interests.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
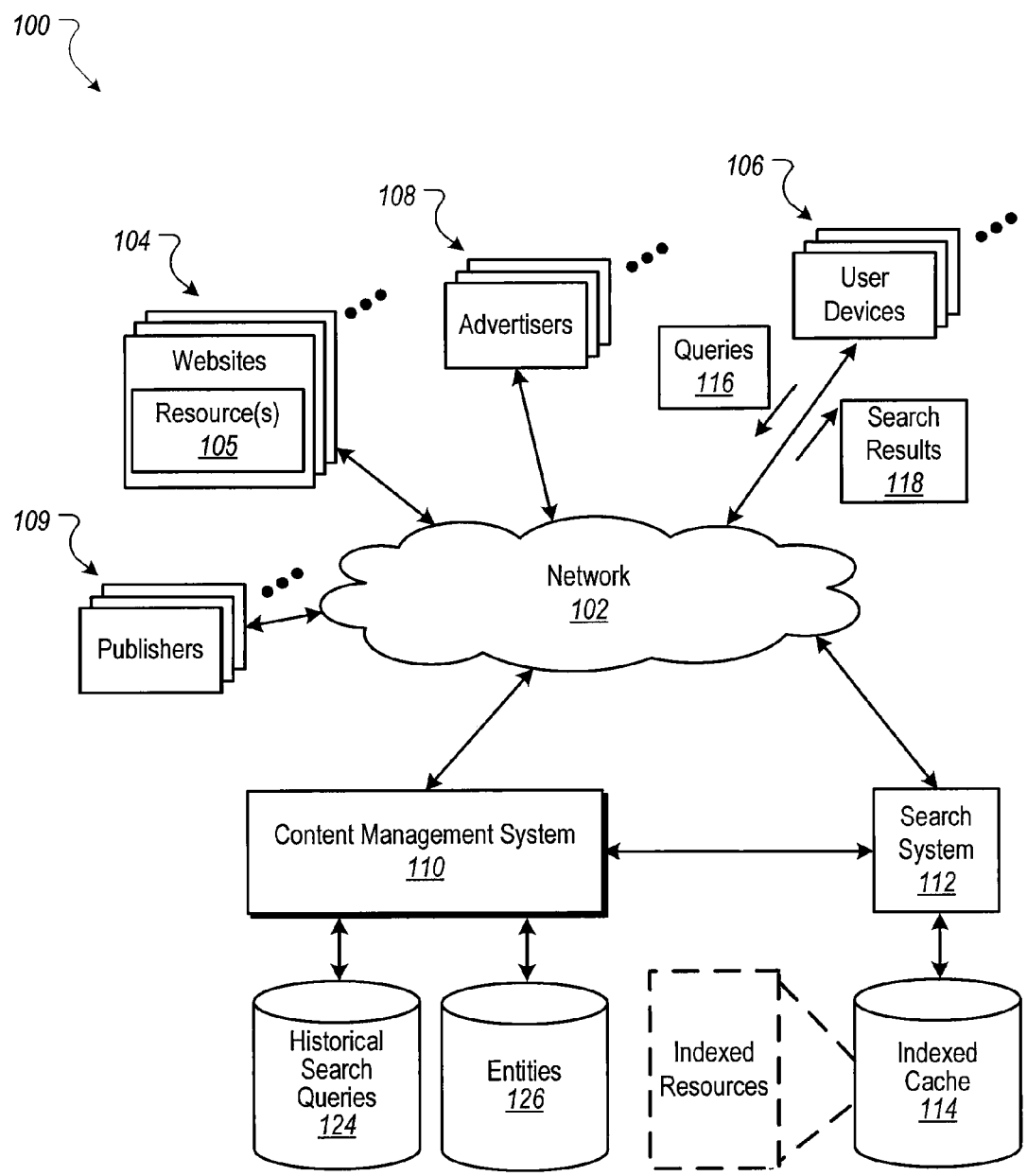
FIG. 1 is a block diagram of an example environment for targeting local content based on user interests.

This document describes methods, processes and systems for targeting local content based on user interests. The local content can be associated with the user's current location or a location of interest of the user. For example, a user with a mobile computing device may be in San Francisco, and the user's current location (e.g., a latitude/longitude) can be determined from GPS capabilities of the user's mobile device. In another example, the user may be in a different location running an application using and/or displaying information associated with San Francisco. A map application may, for example, display a map of San Francisco, accept input from the user specifying a San Francisco address as a starting point or destination, or display driving directions to a San Francisco address. In these examples, the location can be determined from a center coordinate of a map viewport and/or from a specified (or displayed) address or geographic location. In other examples, a user-provided base address or the IP address of the user's device can be used to determine the location. For any such location, a request to serve content (e.g., an ad) to the user's device can occur. In some examples, keywords typically used for selecting content (e.g., search query terms entered in a browser) may not be available. However, by using the location (e.g., an address or latitude/longitude coordinates) in combination with user interests, content can be targeted to the user. In some examples, user interests can be determined from the user's historical search queries, such as recent search queries that the user has submitted. The user's interests in combination with location information can be used to generate targeting keyword by which to target content. In this way, local content items (e.g., ads) can be targeted to the user based on the user's own interests (e.g., not multiple users' interests), without the explicit presence of keywords.

In some implementations, one or more local entities (e.g., local businesses) associated with the location can be determined, e.g., using reverse business look-up techniques. The entities can be ranked using information from historical search queries, e.g., past search queries submitted by the user. A highest-ranked entity can be determined from the local entities. One or more targeting keywords associated with the highest-ranked entity can be identified. Using the targeting keywords, content items can be targeted based on user interests and the highest-ranked entity associated with the location. The targeted items can include advertisements (ads) that can be served for presentation on the user's device in response to the request for content. The ads that are targeted can include, for example, ads for local entities that are ranked according to user interests. In some implementations, keywords such as targeting keywords, can consist of one or more terms. As a result, targeting keywords can be targeting phrases, such as the targeting keyword "Thai restaurants" having two terms.

In some implementations, a request for content is received from a user. One or more keywords are inferred from the location associated with the request or are obtained from keywords associated with the request. Historical search queries received from the user are evaluated to determine one or more interests of the user. The keywords are weighted based on the determined user interests. Targeting keywords are determined from the weighted keywords and used to select content items that are responsive to the request for content. In some implementations, content items can be provided that are selected based on user interests, keywords associated with a location, and categories associated with a prominent entity at the location.

Historical search queries received from the user are evaluated to determine one or more interests of the user (FIG. 1 is a block diagram of an example environment 100 for ranking local content based on user interests. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content providers (e.g., advertisers 108), publishers 109, and the content management system 110. The example environment 100 may include many thousands of websites 104, user devices 106, and content sponsors (e.g., advertisers 108).

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some examples, requests for content other than, or in addition to, search queries 116 can occur, such as requests for content based on a location, as is described in this document. In these examples, no search terms are explicitly provided by the user, but keywords for which to target content items can be inferred from the user's interests and from the location associated with the request for content as is described further below.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116. In some implementations, keywords can be inferred from a location, such as based on the user's current geographic location and/or a location-of-interest for the user.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. However, in applications in which search queries 116 are not used, the content management system 110 can use other ways of selecting content, e.g., in the absence of keywords obtained from search queries 116. For example, as described within this document, the content management system 110 can select content using keywords inferred from the user's current location or location-of-interest and historical search queries for the user.

The content management system 110 can select from the eligible content items that are to be provided for presentation in slots of a resource or search results page based at least in part on results of an auction. For example, for the eligible content items, the content management system 110 can receive bids from content sponsors (e.g., advertisers) and allocate the slots, based at least in part on the received bids (e.g., based on the highest bidders at the conclusion of the auction). The bids are amounts that the content sponsors are willing to pay for presentation (or selection) of their content with a resource or search results page. For example, a bid can specify an amount that a content sponsor is willing to pay for each 1000 impressions (i.e., presentations) of the content item, referred to as a CPM bid. Alternatively, the bid can specify an amount that the content sponsor is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by serving content that is more likely to be of interest to the user. For example, if a content item that is served is selected in part based on the user's current location and interests, then the user may be more likely to interact with the content item because it includes content that is more relevant to the user, e.g., may be associated with entities (e.g., businesses, restaurants, stores, etc.) that are in the user's immediate vicinity.

Historical search queries 124 can include information about the user's past queries, including, for example, any of the user's search queries and the corresponding query terms recently submitted (e.g., in web browsers) during the last few hours. In some implementations, the historical search queries 124 can identify the content that was delivered in response to the query, e.g., URLs of resources that were responsive to the user's queries. In some implementations, historical search queries 124 can identify user transactions, such as clicks and impressions (e.g., ad impressions). In some implementations, historical search queries 124 can logically include cookies stored on the user device 106 that can contain information regarding the user's most recent Internet activity. The historical search queries 124 can be anonymized so that the privacy of users is protected. For example, quasi-unique identifiers can be associated with users, but the actual identifying information of the users is not stored in the historical search queries 124. Additionally, any identified user preferences or user interactions can be generalized (for example, generalized based on user demographics) rather than associated with a particular user. Encryption and obfuscation techniques can also be used to protect the privacy of users.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, zip code, or state level), so that a particular location of a user cannot be determined. In some implementations, opt out features related to social networking systems, for example, can allow the user to specify that the user's activity stream content is not to be used in ads, or to anonymize the information in some way.

Entities 126 can identify businesses, stores, restaurants, etc. having brick-and-mortar locations that can, for example, publish content and/or advertise on the Internet. For example, entities 126 can be stored and/or indexed on a location basis so that one or more entities associated with a given geographic location (e.g., a latitude/longitude point) can be looked up, such as using reverse business lookup techniques. In some implementations, entities 126 can be implemented as a logical or physical data store of entity entries. For example, each entity entry can include an entity name (e.g., the name of the business, store, restaurant, etc.), the entity's location information (e.g., a latitude/longitude and/or an address), business category information associated with the entity, keywords associated with the entity, and so on. One example entry in the entities 126 can be a San Francisco restaurant that includes the restaurant's name (e.g., Nick's Thai Emporium), address (e.g., 14358 Poplar Street, San Francisco, Calif., 94123), latitude/longitude coordinates, business categories (e.g., restaurants, Thai, ethnic, organic, vegetarian, etc.) and other information. In some implementations, entities associated with a location can be determined, and targeting keywords can be generated from the entities' information. The targeting keywords can be used, for example, to target content (e.g., ads) associated with the entities.

Figure 2A:
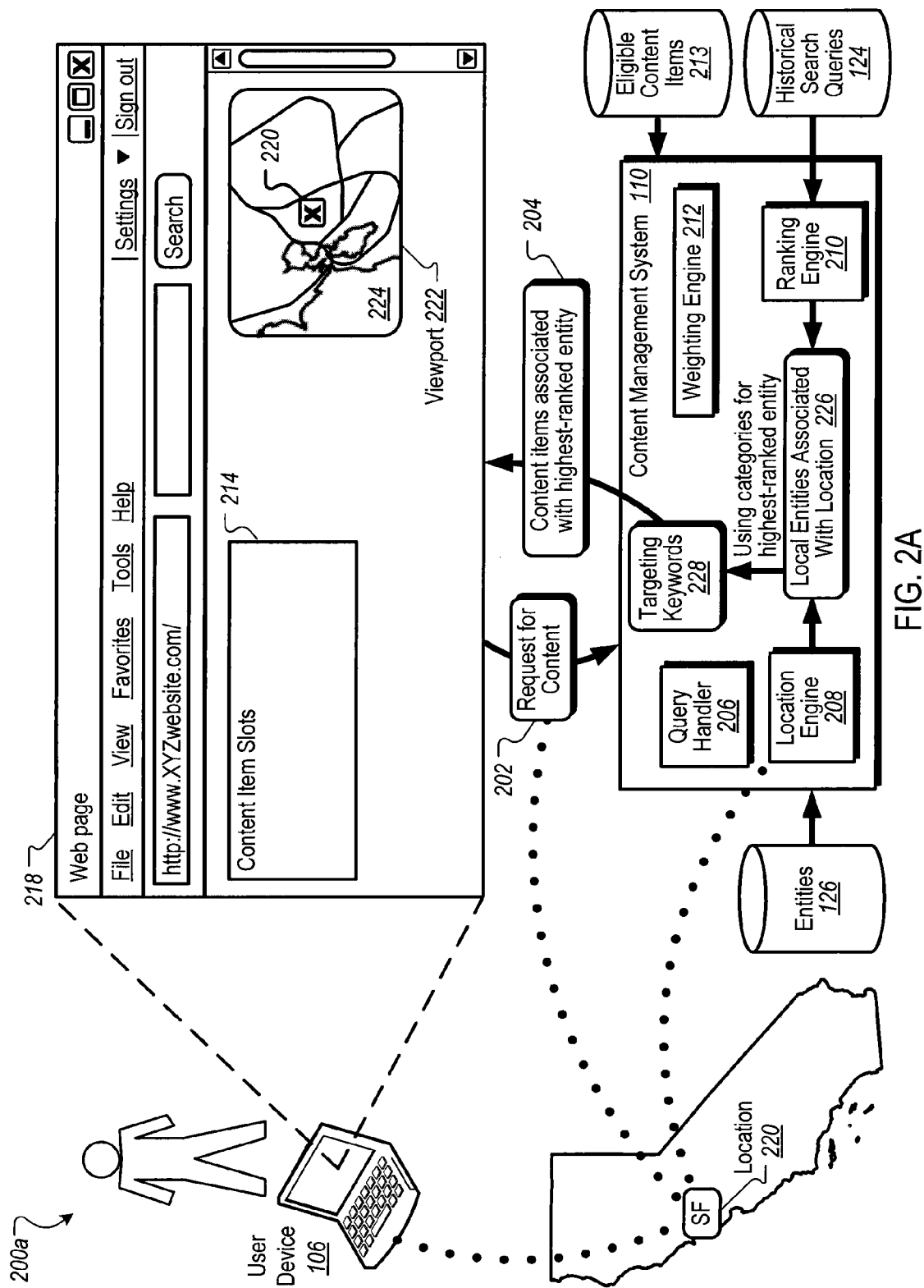
FIG. 2A is a block diagram showing an example system for targeting content associated with local entities based on user interests.

FIG. 2A is a block diagram showing an example system 200a for targeting content associated with local entities based on user interests. As an example, the content management system 110 can receive a request for content 202, such as from a user device 106, and in response, provide content items 204. The content items 204 provided can be targeted and selected based on user interests (e.g., determined from the user's past search queries) and a geographic location associated with the request for content 202 (e.g., the current location of the user). Content management system 110 can include plural engines, including a query handler 206, a location engine 208, a ranking engine 210, a prominent entity engine, a weighting engine 212, and one or more data stores of historical search queries 124. The query handler 206 can receive and store user search queries (e.g., as historical search queries 124) to facilitate identifying user interests for use in targeting content in response to requests for content 202 that are without accompanying keywords (e.g., without search query terms). The location engine 208 can be used to determine the location associated with the request for content 202, such as the user's current location or a location-of-interest. The location engine 208 can also determine entities, such as businesses, stores, restaurants, etc. for the geographic location. The ranking engine 210 can be used to rank elements used within the content management system 110. For example, the ranking engine 210 can rank local entities associated with a location and rank content items. The prominent entity engine can determine a prominent entity for a location, such as a nearby store that is part of a nationwide chain of discount stores. The weighting engine 212 can be used to weight elements used within the content management system 110, including targeting keywords that can be used to target content items in response to the request for content 202. In some implementations, the query handler 206 and plural engines 208-212 can operate as a local search engine that, in combination with the search system 112 (described earlier with reference to FIG.

1), can identify targeting keywords based on location and a highest-ranked entity selected based on the user's interests. The targeting keywords can be used to target resources, e.g., selected from a set of eligible content items 213 (e.g., business listings), and to provide content items 204 that are responsive to the request for content 202. Content items 204 can be rendered in plural content item slots 214 which can include, for example, ad slots for displaying ads and slots for content items that are not ads (e.g., non-ad content for web pages, etc.).

In some implementations, the request for content 202 can be received from the user's user device 106. For example, the request for content 202 can be based on a location associated with a location-related application running on the user device 106, e.g., accessible on a web page 218. Example location-related applications include map applications (e.g., applications for displaying maps and/or requesting and receiving driving directions, etc.) and street view applications (e.g., applications that provide a panoramic view of an area). Other example location-related applications include any applications in which a location can be inferred from data provided by, or displayed to, the user.

In some implementations, the request for content 202 (e.g., an ad request) can be associated with a location 220 (e.g., an address or geographic point in San Francisco) as determined, for example, by the location engine 208. In some implementations, the location 220 can be obtained from the user's user device 106, e.g., using global positioning system (GPS) capabilities of the user device 106, or obtained through cell triangulation, e.g., from three or more signal transmitters, towers or satellites that serve the user device 106. In some implementations, the location of the user device 106 can be obtained through periodic mobile check-ins, such as positional checkpoints made by the mobile device at regular intervals. In some implementations, the location 220 can be determined from geographic information displayed in, or related to, a viewport 222. For example, a map application (or street view application) that is running on the user device 106 can display a map 224 (or street view) of an area in San Francisco within the viewport 222. Then, the location engine 208 can infer the location 220 from, for example, the center-point coordinates of the map's viewport, the field-of-view direction of the street view, or from some other source. In some implementations, the location 220 can be determined from place names (e.g., city names, state names, street names, ZIP codes, etc.) that the user enters into the map application or that can be determined from driving directions provided by the map application. Other ways of determining the location 220 associated with the request for content 202 can be used.

The content management system 110 can target and provide content items 204 in various ways, including based on location and user interests. In some implementations, the content items 204 that are targeted and provided by the content management system 110 can include content items associated with a highest-ranked entity (e.g., a San Francisco store, restaurant or business, etc.) based on user interests and associated with the location 220, as will be described with reference to FIG. 2A. In some implementations, the content items 204 targeted and provided by the content management system 110 can include highest-ranked content items associated with the location 220 that are ranked using interest-based weighting of keywords, as will be described with reference to FIG. 2B.

Referring to FIG. 2A, for example, the content management system 110 can provide content items 204 for a highest-ranked entity associated with the location 220. For example, the location 220 can be used to identify brick-and-mortar business locations (e.g., stores, restaurants, businesses, etc.) associated with (e.g., at or near) the location 220. In this example, the location 220 can be a point (e.g., a latitude/longitude coordinate pair or a street address) in San Francisco or a region in San Francisco. In some implementations, the location 220 can be represented as the region that encompasses a region within a predetermined distance or radius of a point or other area. For map applications, for example, the location 220 can be a latitude/longitude point, or a region surrounding that point. For street view applications, for example, the location 220 can include a point (e.g., the address of the nearest entity in a field-of-view direction) or an area (e.g., a corridor centered on a line-of-sight and having a width and length). As such, entities that are considered to be associated with the location 220 can include entities near the location 220 and/or entities that are within the region defined by the location 220.

Local entities 226 associated with the location 220 can be identified by the content management system 110 at least in part by the location engine 208. In some implementations, the location engine 208 can use the location 220 to identify local entities 226 from the entities 126. For example, the local entities 226 associated with the location 220 can be determined by providing the latitude/longitude coordinates, street address or an area representing the location 220, and then performing a reverse business lookup to determine entities at that location.

Once the local entities 226 are identified (e.g., based on the location 220 associated with the request for content 202), the local entities 226 can be ranked by user interests. User interest in entities can be determined, for example, from historical search queries, including previous search queries that the user may have entered recently (e.g., within the last few hours). For example, the user may have included the name of a business entity in search query entered in a web browser. In another example, the user may have entered a recent search query from which business categories can be determined, and the business categories can also be used in ranking local entities 226. In some implementations, user interests can also be determined in other ways, such as from user-supplied profile information, or from user interest information inferred and/or stored for the user in other ways (e.g., in cookies). In some implementations, local entities 226 can be cached for a user, such as if the user remains in the same general area when successive requests for content 202 occur.

In some implementations, the ranking engine 210 can rank the local entities 226 based on user interest, e.g., using historical search queries 124 associated with the user. The ranking engine 210 can further identify a highest-ranked entity. For example, the highest-ranked entity that is identified can be a Thai restaurant (e.g., Nick's Thai Emporium) in downtown San Francisco. In this example, the Thai restaurant can be identified because the user may have entered a significant number (e.g., one or more) Thai- and restaurant-related search queries in the last few hours prior to the occurrence of the current request for content 202. The user interest can be determined, for example, by analyzing historical search queries 124 for the user.

Once the highest-ranked entity is identified, one or more targeting keywords associated with the highest-ranked entity can be identified. For example, the content management system 110 can use information available in the entities 126 that corresponds to the highest-ranked entity, including for example, categories associated with the highest-ranked entity. For example, if the highest-ranked entity is Nick's Thai Emporium, then the content management system 110 can identify targeting keywords using the highest-ranked entity's associated categories (e.g., restaurants, Thai, ethnic, organic, vegetarian, etc.). Using the targeting keywords, the content management system 110 can identify, rank and subsequently provide one or more content items 204. For example, the content items 204 can include content items (e.g., including ads) for Nick's Thai Emporium as well as content items, for example, for other restaurants in the area and/or other content items matching the targeting keywords. The content items can be displayed, for example, in any of the content item slots 214 on the web page 218, such as in one or more ad slots on which a map application or a street view application is running. In this way, the user operating the user device 106, for example, can view an ad that is relevant to the location (e.g., the location displayed on the screen) and the user's interests.

Figure 2B:
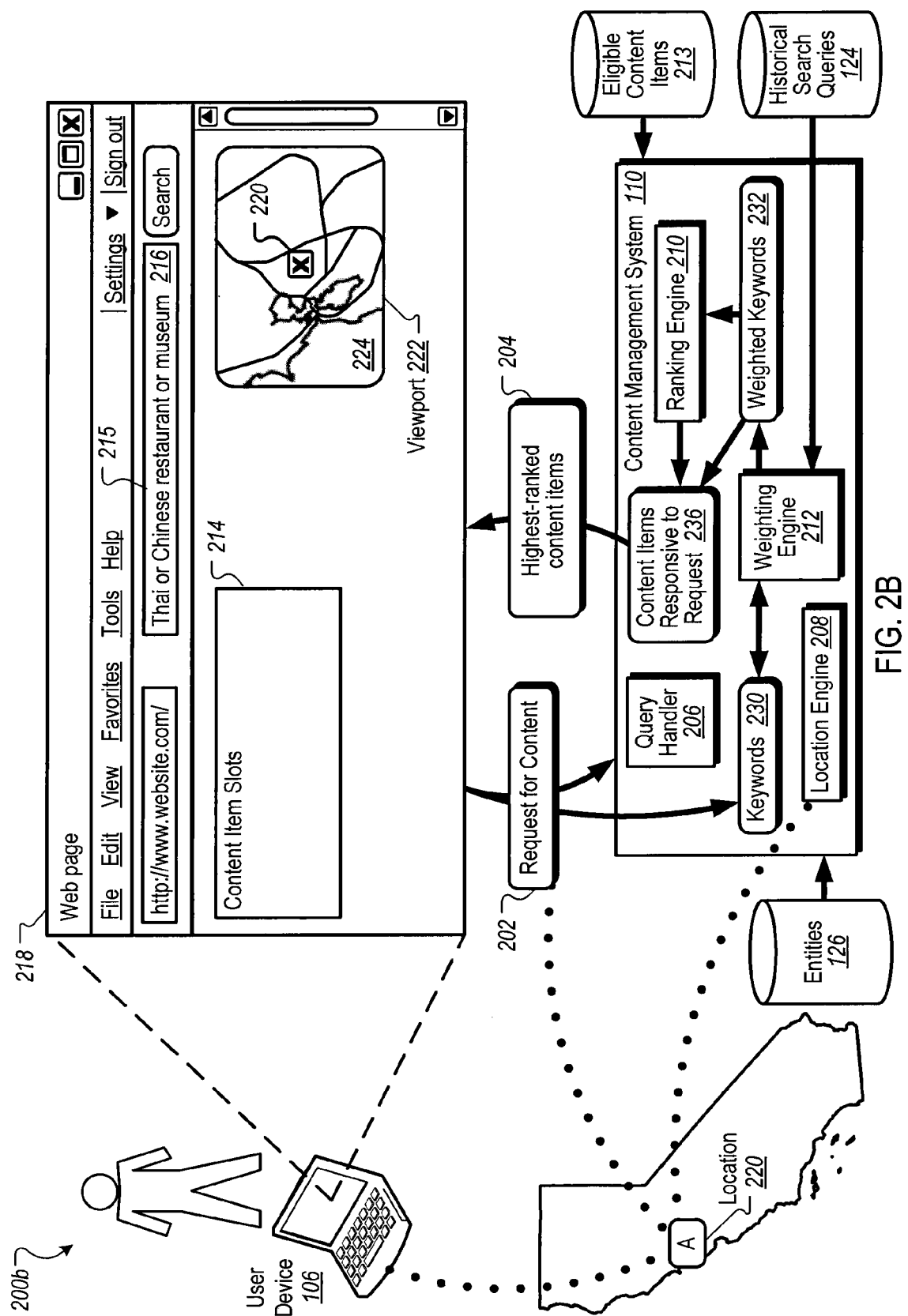
FIG. 2B is a block diagram showing an example system that provides highest-ranked content items associated with a location and ranked using interest-based weighting of keywords.

FIG. 2B is a block diagram showing an example system 200b that provides highest-ranked content items associated with a location and ranked using interest-based weighting of keywords. For example, the content management system 110 can provide content items 204 that include highest-ranked content items associated with the location 220 that are ranked using interest-based weighting of keywords. For example, keywords can be inferred from a location (e.g., the location 220 San Francisco) associated with the request for content 202, as described above. In another example, the query handler 206 can extract one or more keywords 230 (e.g., keywords "Thai," "Chinese," "restaurant" and "museum") from the request for content 202 that is received by the content management system 110. The keywords 230 "Thai," "Chinese," "restaurant" and "museum" can be based, for example, on the search query 215 (e.g., "Thai or Chinese restaurant or museum") that the user enters in the search field 216.

In some implementations, entities associated with the location can be determined. For example, the content management system 110, using the location engine 208, can determine entities that are near the location 220, such as restaurants or other businesses. A highest-ranked entity can be determined based on the user's past queries. For example, the highest-ranked entity can be a Thai restaurant that is determined based on analyzing queries that the user has entered recently (e.g., in the last to hours). Business categories corresponding to the highest-ranked entity can be determined. For example, categories that are determined for the highest-ranked entity, the Thai restaurant, can include Asian restaurants, take-out restaurants, family-oriented restaurants, and so on. One or more of the business categories can be used to generate one or more additional keywords. For example, the keywords "Asian restaurants," "take-out restaurants" and "family-oriented" can be added to the existing keywords.

For use in weighting the keywords 230, the content management system 110 can evaluate historical search queries received from the user (e.g., in the historical search queries 124) to determine one or more interests of the user. For example, user interests can be determined by evaluating queries received by the user within a recent time period (e.g., the last few hours). During that time, for example, the user may have entered twelve queries using a query term "restaurant," seven queries using a query term "Thai," yet zero queries using either of the query terms "Chinese" and "museum." Based on this information, e.g., the number of the user's past queries including query terms "Thai," "Chinese" and "restaurant," the weighting engine 212 can produce weighted keywords 232, providing a greatest weight to the keyword "restaurant" (e.g., based on twelve past queries), a lesser weight to the keyword "Thai" (e.g., based on seven past queries), and low weights to the keywords "Chinese" and "museum" (e.g., based on zero past queries for each keyword). In this way and/or in other ways, the weighted keywords 232 can be weighted based on user interests that are determined for the user. In some implementations, keyword phrases can serve as keywords, e.g., "Thai restaurants" can be considered a keyword.

One or more content items 236 responsive to the request for content 202 and using the weighted keywords 232 can be determined. In some implementations, to determine the content items 236, the content management system 110 can access eligible content items 213 that match the weighted keywords 232 and that are associated with the location 220 San Francisco. The ranking engine 210 can rank the content items 236 based, at least in part, on the weighted keywords 232. As a result, the content management system 110 can provide the content items 204 that include the highest-ranked content items associated with the location 220 that are ranked using an interest-based weighting of the keywords. As a result, the content items 204 that the content management system 110 provides in response to the request for content 202 can include an ad for a Thai restaurant. The ad can be displayed, for example, in one of the content item slots 214 (e.g., an ad slot on a web page running a map application).

Figure 3A:
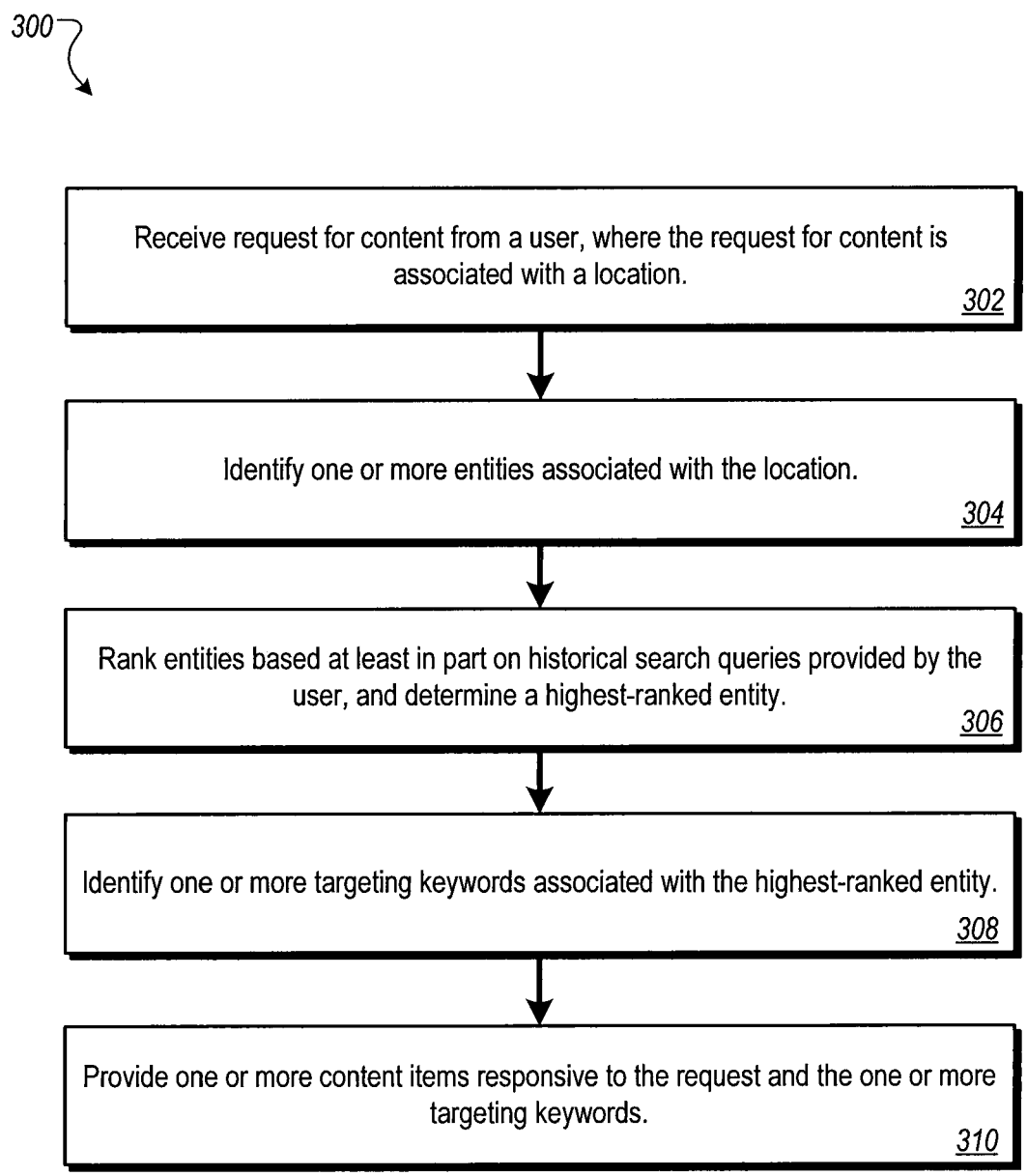
FIG. 3A is a flowchart of an example process for ranking local content based on user interests.

FIG. 3A is a flowchart of an example process 300 for ranking local content based on user interests. The process 300 can be performed by the content management system 110, for example, using the query handler 206, the location engine 208 and the ranking engine 210. FIG. 2A is used to provide examples for steps of the process 300.

A request for content is received from a user (302). The request is associated with a location. For example, the content management system 110 can receive the request for content 202 that is associated with the location 220 (e.g., a point, address or area in San Francisco). As an example, the user may be running a map application, and the center point of the map 224 displayed in the viewport 222 may be near Nick's Thai Emporium. The request for content 202 in this example can be a request for an ad to fill one of the content item slots 214.

One or more entities associated with the location are identified (304). As an example, the location engine 208 can identify local entities 226 (e.g., stores, restaurants, businesses, etc.) using the location 220 (e.g., a latitude/longitude coordinate or address) to perform reverse business lookups. The entities identified can include Nick's Thai Emporium and other entities in the area.

The entities are ranked based at least in part on historical search queries provided by the user, and a highest-ranked entity is determined (306). For example, the ranking engine 210 can rank the local entities 226 using user interest information determined from the user's recent search queries, e.g., available from the historical search queries 124. The ranking engine 210 can further identify a highest-ranked entity, e.g., Nick's Thai Emporium, as the entity that most closely matches the user's recent search queries. For example, the user may have submitted several recent queries related to restaurants or search queries involving Thai-related subjects, and not a set of search queries that could lead to the identification of a different entity as the highest-ranked entity.

In some implementations, ranking entities can include ranking the entities based on prominence scores associated with the respective entities and/or based on user interests derived from the historical search queries. For example, the ranking engine 210 can use prominence scores associated with the Thai restaurant and other local entities 226. The prominence scores, for example, in the extent by which the entities are represented in the historical search queries accessed from the historical search queries 124, can show the prominence of an entity relative to other entities.

In some implementations, ranking includes evaluating the historical search queries to identify one or more interests associated with the user and ranking the entities based at least in part on the identified interests. For example, as a result of evaluating the historical search queries for the user, the content management system 110 can determine that the user is interested in interest categories of restaurants, sports and medicine.

One or more targeting keywords associated with the highest-ranked entity are identified (308). For example, the content management system 110 can identify one or more targeting keywords associated with the highest-ranked entity (e.g., Nick's Thai Emporium). The targeting keywords can include, for example, categories associated with the highest-ranked entity (e.g., restaurants, Thai, ethnic, organic, vegetarian, etc.).

One or more content items associated with highest-ranked entity responsive to the request and the one or more targeting keywords are provided (310). For example, using the targeting keywords, the content management system 110 can provide one or more content items 204. The content items 204 can include content items (e.g., including ads) for Nick's Thai Emporium as well as content items, for example, for other restaurants in the area and/or other content items matching the targeting keywords.

In some implementations, a method can be used in which one or more entities (e.g., local entities 226) associated with a location (e.g., location 220) can be identified. The entities can be ranked based at least in part on historical search queries 124 provided by the user, including determining a highest-ranked entity (e.g., Nick's Thai Emporium). One or more targeting keywords (e.g., restaurants, Thai, ethnic, organic, vegetarian, etc.) associated with the highest-ranked entity can be identified. The targeting keywords can be provided, for example, as part of a request for content for the location. In some implementations, providing the keywords can include providing one or more highest ranked keywords. For example, keywords used by the content management system 110 (and, for example, in combination with the search system 112 to select content) can include highest ranked keywords (e.g., restaurants and Thai). In some implementations, providing the keywords can include providing the keywords and a ranking for the keywords based on the historical search queries. For example, the keywords "restaurants" and "Thai" can have the first- and second-highest rankings of the keywords based at least in part on analysis of historical search queries 124.

Figure 3B:
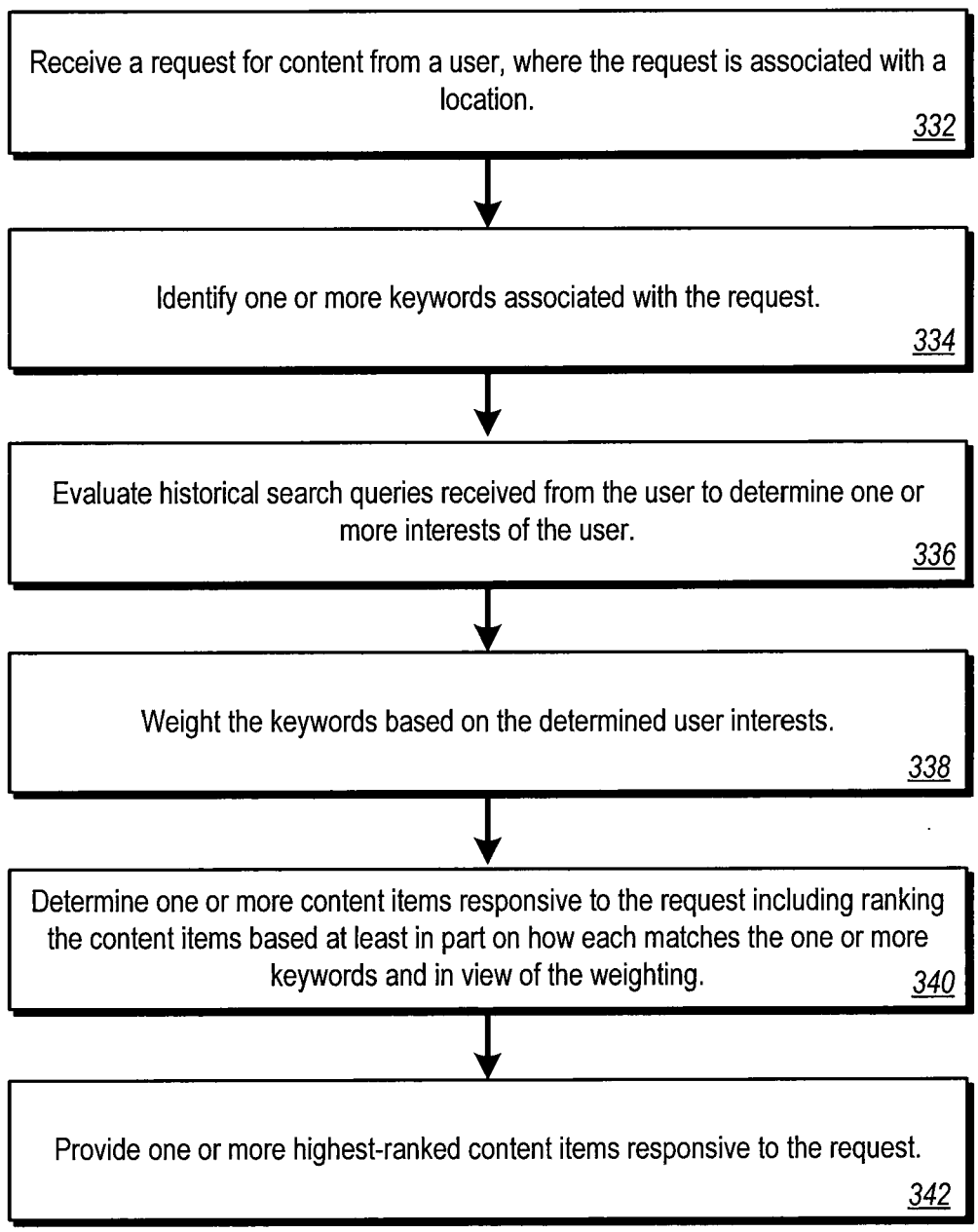
FIG. 3B is a flowchart of an example process for providing highest-ranked content items associated with a location that are ranked using interest-based weighting of keywords.

FIG. 3B is a flowchart of an example process 330 for providing highest-ranked content items associated with a location that are ranked using interest-based weighting of keywords. The process 330 can be performed, for example, by the content management system 110 including the query handler 206, the location engine 208, the ranking engine 210 and the weighting engine 212. FIG. 2B is used to provide examples for steps of the process 330.

A request for content is received from a user (332). For example, the content management system 110 can receive the request for content 202.

One or more keywords associated with the request are identified (334). For example, keywords 240 can be inferred from the location 220 (e.g., San Francisco) that is associated with the request for content 202, as described above. In another example, if the request for content 202 is based on the search query 215 (e.g., "Thai restaurant") entered in the search field 216, then the keywords 240 can be determined from terms in the search query 215.

Historical search queries received from the user are evaluated to determine one or more interests of the user (336). For example, the content management system 110 can determine user interests by evaluating the user's recent search queries, e.g., available from the historical search queries 124. The evaluation can include determining user interests based on query terms of search queries that the user may have entered during a recent time period (e.g., the last few hours). For example, as described above with reference to FIG. 2B, the content management system 110 can determine that the user's interests include "restaurants" (e.g., based on twelve past queries) and "Thai" (e.g., based on seven past queries). In this example, the content management system 110 can conclude, based on the number of queries (e.g., twelve vs. seven), that the user is more interested in "restaurants" than "Thai."

The keywords are weighted based on the determined user interests (338). As an example, the weighting engine 212 can use user interest information (e.g., user interests in "restaurants" and "Thai") to produce weighted keywords 232. In this example, the weighting engine 212 can assign a greater weight to the keyword "restaurant" (e.g., based on twelve past queries), and a lesser weight to the keyword "Thai" (e.g., based on seven past queries), and low weights to the keywords "Chinese" and "museum" (e.g., based on zero past queries for each keyword). In this way, the weighted keywords 232 can be weighted based on user interests.

In some implementations, weighting includes assigning weights to each keyword based on a relevance to the user's interests. For example, the weighting engine 212 can assign higher weights to individual keywords (e.g., café) within the weighted keywords 232 that are more relevant to the user's interests (e.g., restaurants). In this example, a relatively high weight can be assigned to "café" because cafés are typically considered to be restaurants. By comparison, a keyword such as "food" may receive a lower weight than "café" because "food" can be considered to be less relevant to restaurants than "cafés."

In some implementations, weighting includes eliminating one or more keywords that are irrelevant to the user's interests. As an example, the content management system 110 may determine that, based on the user's search queries from the previous two hours, the user's interests are limited to restaurants, sports and education. If the request for content 202 includes a keyword "medicine" (e.g., irrelevant to any/all of restaurants, sports and education), then the weighting engine 212 can remove the keyword "medicine" from the weighted keywords 232. In some implementations, removing a keyword in this way can be accomplished by assigning a zero weight.

In some implementations, weighting includes adding one or more additional keywords to the set of keywords used for the ranking. For example, the content management system 110 may determine that the user has a significant interest in Japan, based on past user queries (e.g., in the last few hours). If the keywords associated with the request for content 202 are "inexpensive" and "restaurant," then the weighting engine 212 can add the keyword "Japanese" to the weighted keywords 232, e.g., assigning a weight that reflects the user's interest, such as based on the number of search queries including "Japan."

In some implementations, weighting includes filtering the plurality of keywords to determine keywords most relevant to the user's interests. For example, the weighted keywords 232 can include several keywords, and the weighting engine 212 can eliminate some of the less relevant keywords (e.g., having the lowest weights based on the user's interest), e.g., keeping the weighted keywords 232 that are the most relevant (e.g., having the highest weights based on the user's interest).

One or more content items responsive to the request are determined, and the content items are ranked based at least in part on how each matches the one or more keywords and in view of the weighting (340). For example, the content management system 110 can access one or more content items 236 that are responsive to the request for content 202. In some implementations, the content management system 110 can determine the content items 236 by accessing eligible content items 213 that match the weighted keywords 232. The ranking engine 210, for example, can rank the content items 236 based, at least in part, on the weighted keywords 232.

One or more highest-ranked content items are provided in response to the request (342). As an example, the content management system 110 can provide the content items 204 that include the highest-ranked content items associated with the location 220 that are ranked using interest-based weighting of keywords. For example, the one or more content items 204 that the content management system 110 provides in response to the request for content 202 can include one or more ads for Thai restaurants that can be displayed in the content item slots 214.

In some implementations in which content items are determined for entities associated with a location, the process 330 can further include using the weighted keywords to identify an entity from the one or more entities, and providing one or more highest-ranked content items responsive to the request can include providing an associated content item for the entity to the user. For example, the content management system 110 can use the weighted keywords 232 determined by the weighting engine 212 to identify an entity from among the local entities 226 (see FIG. 2A), such as a highest-ranked entity based on the weighted keywords 232. Further, the content management system 110 can include the highest-ranking entity with the content items 204.

In some implementations, the process 330 can further include identifying one or more categories of business or service associated with the entities at the location, and determining one or more content items can further include determining one or more content items associated with the categories and ranking the content items using the weighted keywords. For example, the content management system 110 can categorize an entity such as a surf board shop as a member of a sporting goods category. The content management system 110 can then determine one or more content items (e.g., ads for sporting goods stores), and the ranking engine 210 can rank the content items.

In some implementations, ranking the keywords can include assigning a weight to each keyword and using the weights to determine a highest ranking matching content item in view of the weighted keywords. For example, the weighting engine 212 can assign a weight to each of the weighted keywords 232 and use the assigned weights to rank the keywords according to the user interests.

In some implementations, a method can be used in which one or more keywords (e.g., restaurants, Thai, ethnic, organic, vegetarian, etc.) associated with a request for content are identified. Historical search queries 124 received from the user are evaluated to determine one or more interests of the user. The keywords are weighted based on the determined user interests. The weighted keywords 232 are provided along with the request to the content management system 110 (e.g., for use in combination with the search system 112) for identification of a content item responsive to the request. In some implementations, providing the weighted keywords can include providing one or more highest ranked weighted keywords. In some implementations, providing the weighted keywords can include providing the keywords and the weights to the content management system 110. In some implementations, providing the weighted keywords can include providing the weighted keywords and a ranking based on the one or more interests of the user.

Figure 3C:
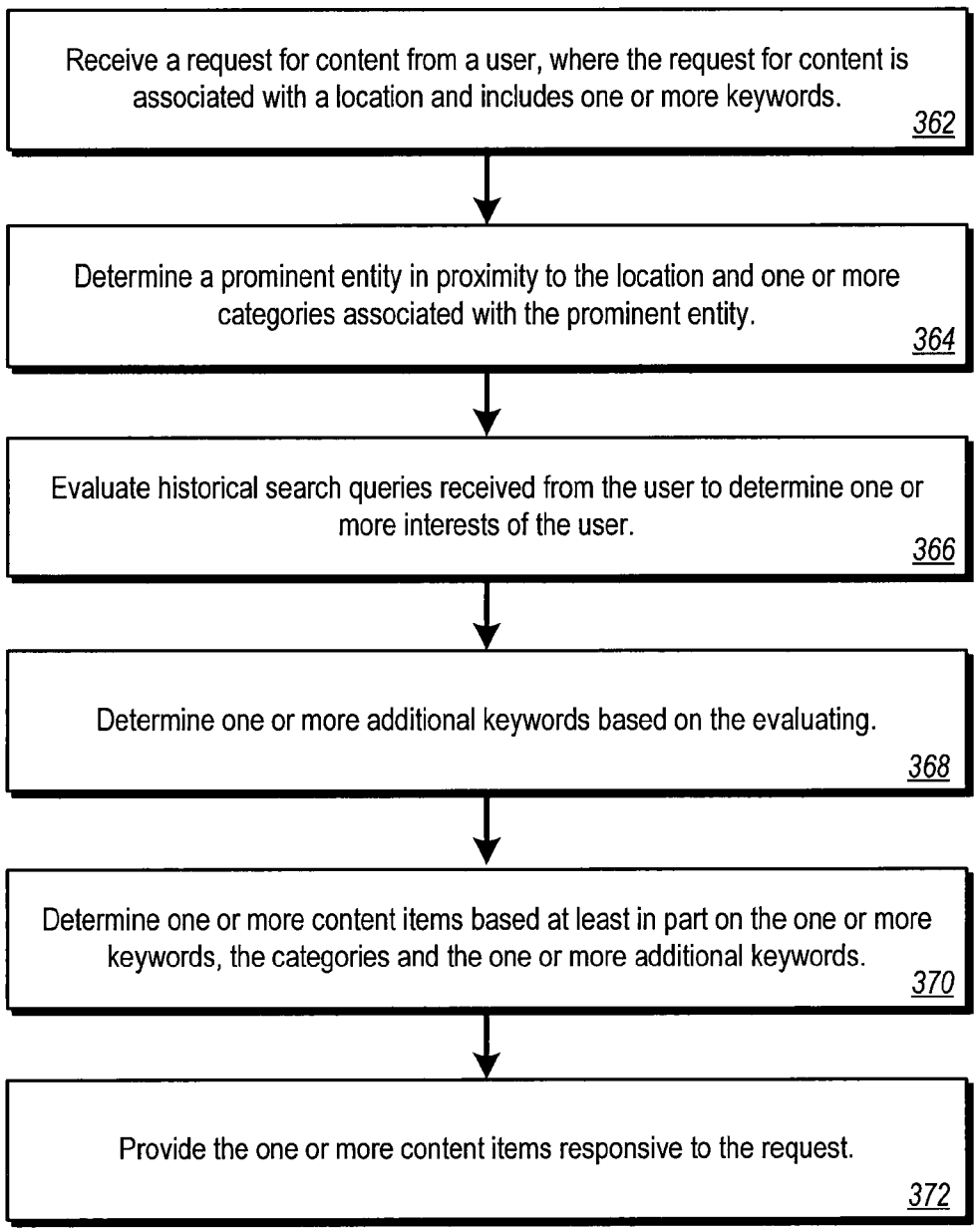
FIG. 3C is a flowchart of an example process for providing content items based on user interests, keywords associated with a location, and categories associated with a prominent entity at the location.

FIG. 3C is a flowchart of an example process 360 for providing content items based on user interests, keywords associated with a location, and categories associated with a prominent entity at the location. The process 360 can be performed, for example, by the content management system 110. FIG. 2B is used to provide examples for steps of the process 360.

A request for content is received from a user, the request for content being associated with a location and including one or more keywords (362). For example, the content management system 110 can receive the request for content 202. In some implementations, keywords associated with the request for content 202 can be inferred from the location 220, as described above. In some implementations, keywords can be obtained from terms of the request for content (e.g., search query 215).

A prominent entity is determined that is in proximity to the location, and one or more categories associated with the prominent entity are determined (364). For example, the prominent entity engine can use reverse business look-up techniques described above to determine that a XZ-Mart Store is the most prominent entity for the location 220. The content management system 110 can determine categories (e.g., sporting goods, housewares, clothing, etc.) that are associated with the XZ-Mart Store, based on the types of products that the store sells.

Historical search queries received from the user are evaluated to determine one or more interests of the user (366). As an example, the content management system 110 can determine that the user in interested in camping gear by evaluating the user's recent search queries using information in the historical search queries 124. For example, the user may have entered numerous queries within the last few hours that are related to tents, camp stoves and other camping equipment.

One or more additional keywords are determined based on the evaluating of the historical search queries (368). For example, keywords based on categories from the XZ-Mart Store can include "sporting goods," "housewares" and "clothing." These keywords can be evaluated in light of the user's interests, such as to determine overlapping keywords (e.g., "sporting goods" and the camping-related keywords). The resulting keywords can combined with keywords inferred from the user's location 220 and/or keywords from the request.

One or more content items are determined based at least in part on the one or more keywords, the categories and the one or more additional keywords (370). As an example, the content management system 110 can determine content items using the keywords based on user interests, keywords associated with a location, and categories associated with a prominent entity at the location.

The one or more content items are provided in response to the request (372). The content management system 110, for example, can provide the content items 204 to the web page 218.

In some implementations, determining the one or more content items can include ranking the one or more content items, where ranking can include ranking the one or more content items based at least in part on the user's interests. For example, the ranking engine 210 can rank the content items 204 based on the user's interests (e.g., camping gear) as determined by evaluating the user's recent queries.

Figure 4:
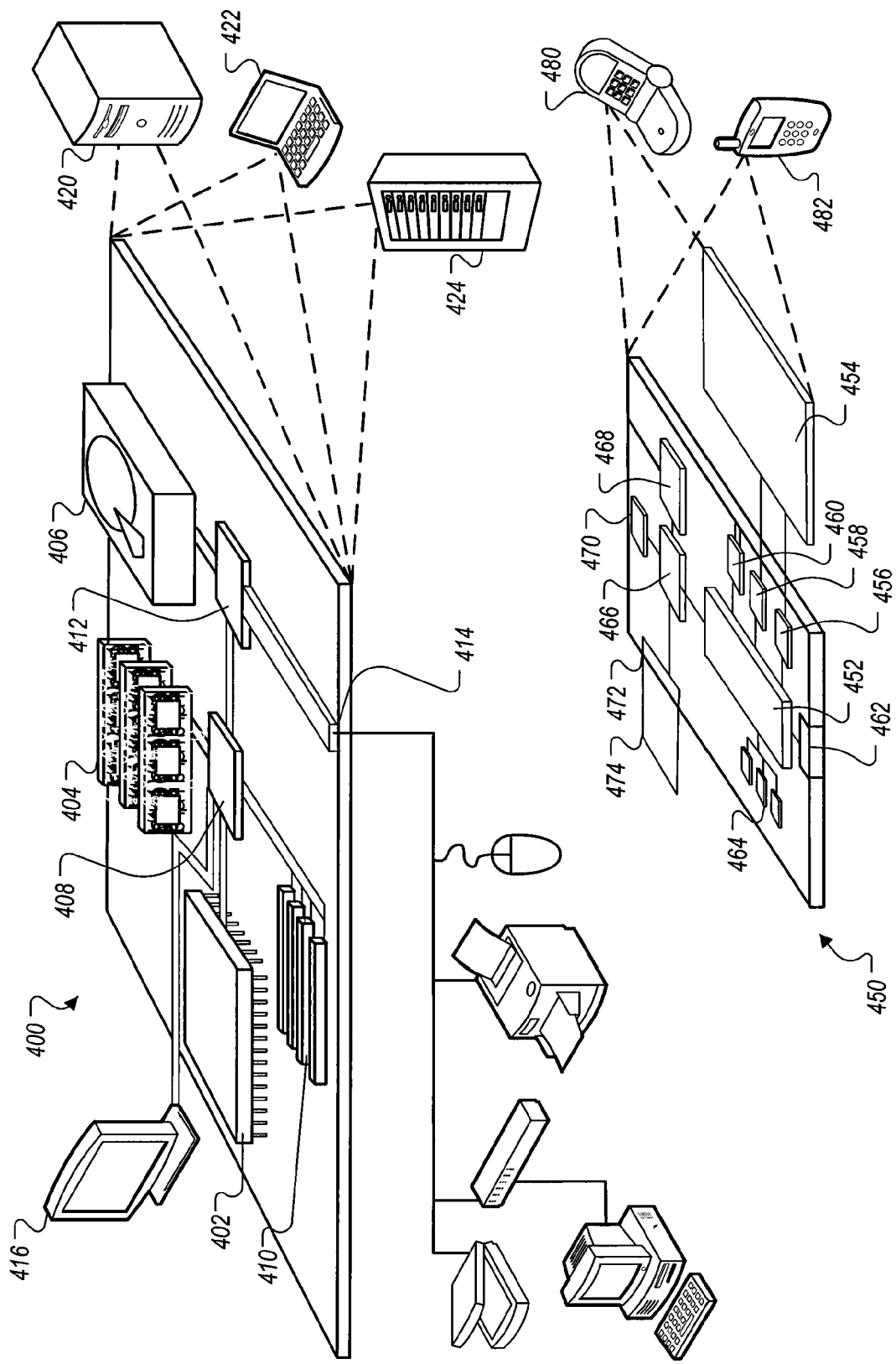
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, from a user device, a request for content submitted by a particular user, the request for content being associated with a location and including one or more keywords;
   determining, by one or more processors, one or more entities located proximate to the location associated with the request;
   determining, by the one or more processors, a prominent entity of the one or more entities located proximate to the location associated with the request;
   determining, by the one or more processors, one or more categories associated with the prominent entity;
   evaluating, by the one or more processors, historical search queries submitted by the particular user to determine:
      one or more interests of the particular user; and
      one or more additional keywords associated with the particular user;
   identifying, by the one or more processors, one or more content items responsive to the request based at least in part on the one or more keywords included with the request for content, the one or more categories included with the prominent entity, the one or more interests of the particular user and the one or more additional keywords; and
   providing, to the user device, the one or more content items responsive to the request for presentation to the particular user, such that the particular user is presented with one or more content items identified based at least in part on one or more keywords included with the request for content, one or more categories associated with a prominent entity of one or more entities determined to be located proximate to a location associated with the request, wherein the one or more interests of the particular user are identified based at least in part on historical search queries submitted by the particular user, and the one or more additional keywords associated with the particular user identified based at least in part on historical search queries submitted by the particular user, wherein the additional keywords are not included in the request for content submitted the particular user.

2. The method of claim 1 where identifying one or more content items includes ranking the one or more content items based at least in part on the one or more interests of the particular user by performing actions comprising:
   determining an amount of times a given keyword among the keywords included in the request, keywords generated from the one or more categories, or the additional keywords is included in the historical search queries submitted by the particular user;
   determining a weight for the given keyword based at least in part on the amount of times the given keyword is included in the historical search queries submitted by the particular user and amounts of time that have elapsed since respective queries including the given keyword were submitted; and
   ranking the one or more content items based at least in part on the weight for the given keyword.

3. The method of claim 1 where the location is determined from latitude/longitude coordinates of a viewport in a map-related application.

4. The method of claim 1 where the location is determined from GPS coordinates of the user device.

5. The method of claim 1 where the location is determined from street addresses in a map-related application.

6. The method of claim 1 where evaluating historical search queries includes evaluating search terms included in the one or more historical search queries to determine user interests.

7. The method of claim 6 where evaluating historical search queries includes evaluating a content item that satisfies a historical search query to determine user interests.

8. A computer program product tangibly embodied in a computer-readable storage device and comprising instructions that, when executed by a processor, perform a method for providing content, the method comprising:
- receiving a request for content submitted by a particular user, the request for content being associated with a location and including one or more keywords;
- determining one more entities located proximate to the location associated with the request;
- determining a prominent entity of the one or more entities located proximate to the location associated with the request;
- determining one or more categories associated with the prominent entity;
- evaluating historical search queries received from the particular user to determine:
  - one or more interests of the particular user; and
  - one or more additional keywords associated with the particular user;
- identifying one or more content items responsive to the request based at least in part on the one or more keywords included with the request for content, the one or more categories associated with the prominent entity, the one or more interests of the particular user and the one or more additional keywords; and
- providing the one or more content items responsive to the request for presentation to the particular user, such that the particular user is presented with one or more content items identified based at least in part on one or more keywords included with the request for content, one or more categories associated with a prominent entity of one or more entities determined to be located proximate to a location associated with the request, wherein the one or more interests of the particular user are identified based at least in part on historical search queries submitted by the particular user, and the one or more additional keywords associated with the particular user identified based at least in part on historical search queries submitted by the particular user, wherein the additional keywords are not included in the request for content submitted the particular user.

9. The computer program product of claim 8 where identifying one or more content items includes ranking the one or more content items based at least in part on the one or more interests of the particular user by performing actions comprising:
- determining an amount of times a given keyword among the keywords included in the request, keywords generated from the one or more categories, or the additional keywords is included in the historical search queries submitted by the particular user;
- determining a weight for the given keyword based at least in part on the amount of times the given keyword is included in the historical search queries submitted by the particular user and amounts of time that have elapsed since respective queries including the given keyword were submitted; and
- ranking the one or more content items based at least in part on the weight for the given keyword.

10. The computer program product of claim 8 where the location is determined from latitude/longitude coordinates of a viewport in a map-related application.

11. The computer program product of claim 8 where the location is determined from GPS coordinates of the user device.

12. The computer program product of claim 8 where the location is determined from street addresses in a map-related application.

13. The computer program product of claim 8 where evaluating historical search queries includes evaluating search terms included in the one or more historical search queries to determine user interests.

14. The computer program product of claim 13 where evaluating historical search queries includes evaluating a content item that satisfies a historical search query to determine user interests.

15. A computer system comprising:
- one or more processors; and
- one or more non-transitory computer readable storage medium comprising program instructions stored thereon that are executable by the one or more processors to cause the following steps:
  - receiving, from a user device, a request for content submitted by a particular user, the request for content being associated with a location and including one or more keywords;
  - determining one more entities located proximate to the location associated with the request;
  - determining a prominent entity of the one or more entities located proximate to the location associated with the request;
  - determining, by the one or more processors, one or more categories associated with the prominent entity;
  - evaluating, by the one or more processors, historical search queries submitted by the particular user to determine:
    - one or more interests of the particular user; and
    - one or more additional keywords associated with the particular user;
  - identifying, by the one or more processors, one or more content items responsive to the request based at least in part on the one or more keywords included with the request for content, the one or more categories associated with the prominent entity, the one or more interests of the particular user, and the one or more additional keywords; and
  - providing, to the user device, the one or more content items responsive to the request, wherein the additional keywords are not included in the request for content submitted the particular user.

16. The system of claim 15 where identifying one or more content items includes ranking the one or more content items based at least in part on the one or more interests of the particular user by performing actions comprising:
- determining an amount of times a given keyword among the keywords included in the request, keywords generated from the one or more categories, or the additional keywords is included in the historical search queries submitted by the particular user;
- determining a weight for the given keyword based at least in part on the amount of times the given keyword is included in the historical search queries submitted by the particular user; and ranking the one or more content items based at least in part on the weight for the given keyword.

17. The system of claim 15 where the location is determined from latitude/longitude coordinates of a viewport in a map-related application.

18. The system of claim 15 where the location is determined from street addresses in a map-related application.

19. The system of claim 15 where evaluating historical search queries includes evaluating search terms included in the one or more historical search queries to determine user interests.

20. The system of claim 19 where evaluating historical search queries includes evaluating a content item that satisfies a historical search query to determine user interests.

* * * * *